(12) United States Patent
Sippus

(10) Patent No.: US 11,441,272 B2
(45) Date of Patent: Sep. 13, 2022

(54) METHOD TO PRODUCE A PAPERBOARD, A PAPERBOARD AND A CORRUGATED BOARD

(71) Applicant: Stora Enso OYJ, Helsinki (FI)

(72) Inventor: Tuomo Sippus, Lahti (FI)

(73) Assignee: Stora Enso OYJ, Helsinki (FI)

( * ) Notice: Subject to any disclaimer, the term of this patent is extended or adjusted under 35 U.S.C. 154(b) by 179 days.

(21) Appl. No.: 16/643,060

(22) PCT Filed: Aug. 30, 2018

(86) PCT No.: PCT/IB2018/056616
§ 371 (c)(1),
(2) Date: Feb. 28, 2020

(87) PCT Pub. No.: WO2019/043608
PCT Pub. Date: Mar. 7, 2019

(65) Prior Publication Data
US 2020/0332468 A1 Oct. 22, 2020

(30) Foreign Application Priority Data
Sep. 1, 2017 (SE) .................................. 1751057-9

(51) Int. Cl.
| | |
|---|---|
| *D21H 11/18* | (2006.01) |
| *B32B 7/12* | (2006.01) |
| *B32B 29/00* | (2006.01) |
| *B32B 29/08* | (2006.01) |
| *D21F 11/12* | (2006.01) |
| *C08L 1/02* | (2006.01) |
| *D21D 1/20* | (2006.01) |

(52) U.S. Cl.
CPC ............. *D21H 11/18* (2013.01); *B32B 7/12* (2013.01); *B32B 29/005* (2013.01); *B32B 29/08* (2013.01); *C08L 1/02* (2013.01); *D21D 1/20* (2013.01); *D21F 11/12* (2013.01); *B32B 2250/26* (2013.01); *B32B 2307/718* (2013.01)

(58) Field of Classification Search
CPC .......... D21F 11/12; D21F 9/006; D21F 11/04; D21H 11/18; D21H 27/30; D21H 27/40; B32B 7/12; B32B 29/005; B32B 29/08; B32B 2250/26; B32B 2307/718; B32B 2250/02; B32B 2307/722; B32B 2307/748; B32B 2307/558; B32B 2439/00; B32B 2553/00; C08L 1/02; D21D 1/20
See application file for complete search history.

(56) References Cited

U.S. PATENT DOCUMENTS

| | | | |
|---|---|---|---|
| 3,726,758 A * | 4/1973 | Parker et al. ........... | D21F 9/003 162/123 |
| 4,056,433 A * | 11/1977 | Koponen ................ | D21F 3/04 162/305 |
| 4,443,300 A | 4/1984 | Bubik et al. | |
| 4,879,001 A * | 11/1989 | Cronin .................... | D21F 9/003 162/305 |
| 4,919,760 A * | 4/1990 | Kerttula ................. | D21F 9/003 162/308 |
| 5,389,206 A * | 2/1995 | Buck ...................... | D21F 9/003 162/301 |
| 5,489,365 A | 2/1996 | Wahlstrom | |
| 5,607,555 A * | 3/1997 | Grossmann ............ | D21F 9/003 162/301 |
| 5,871,617 A * | 2/1999 | Iwata ..................... | D21F 9/003 162/301 |
| 6,183,602 B1 * | 2/2001 | Iwata ..................... | D21F 1/48 162/301 |
| 6,221,214 B1 * | 4/2001 | Kotitschke ............ | D21F 3/045 162/305 |
| 6,254,727 B1 * | 7/2001 | Moser .................... | D21F 9/003 162/301 |
| 6,342,126 B1 * | 1/2002 | Grabscheid ........... | D21F 9/003 162/301 |
| 6,398,916 B1 | 6/2002 | Klerelid | |
| 6,413,369 B2 * | 7/2002 | Kinnunen .............. | D21F 9/02 162/304 |
| 6,432,273 B1 * | 8/2002 | Honkalampi .......... | D21F 3/045 162/278 |

(Continued)

FOREIGN PATENT DOCUMENTS

| | | |
|---|---|---|
| CN | 1042744 A | 6/1990 |
| CN | 1379835 A | 11/2002 |

(Continued)

OTHER PUBLICATIONS

S. Norgren et al., in "Strong paper from spruce CTMP—Part II: Effect of pressing at nip press temperatures above the lignin softening temperature," Nordic Pulp & Paper Research Journal, 33(1): 142-149. (Year: 2018).*

(Continued)

*Primary Examiner* — Jose A Fortuna
(74) *Attorney, Agent, or Firm* — Greer, Burns & Crain, Ltd.

(57) ABSTRACT

The present invention relates to a method for producing a paperboard comprising the steps of; providing a furnish comprising cellulosic fibers, applying the furnish on at least one wire to form a web, dewatering the web on said at least one wire by subjecting the web to a pressure above 150 kPa without the use of a press roll nip and thereafter pressing the dewatered web to form a paperboard. The invention also relates to a paperboard and a corrugated board.

12 Claims, No Drawings

(56) References Cited

U.S. PATENT DOCUMENTS

| | | | |
|---|---|---|---|
| 6,537,680 B1 | 3/2003 | Norlander et al. | |
| 6,702,926 B1* | 3/2004 | Egelhof | D21F 1/48 162/132 |
| 6,712,931 B1* | 3/2004 | Gron | D21H 23/20 162/158 |
| 6,855,230 B2* | 2/2005 | Salminen | D21F 7/06 162/263 |
| 7,008,511 B2* | 3/2006 | Haase | D21F 9/003 162/301 |
| 7,364,643 B2* | 4/2008 | Poikolainen | D21F 9/003 162/301 |
| 7,396,437 B2* | 7/2008 | Shead | D21G 9/0027 162/263 |
| 8,435,384 B2* | 5/2013 | Da Silva | D21F 3/0272 162/358.5 |
| 8,544,184 B2* | 10/2013 | Da Silva | D21F 5/182 34/119 |
| 9,518,364 B2 | 12/2016 | Heiskanen et al. | |
| 9,988,765 B2 | 6/2018 | Räsänen et al. | |
| 10,787,770 B2* | 9/2020 | Heiskanen | C09J 103/02 |
| 2001/0011584 A1* | 8/2001 | Kinnunen | D21F 9/02 162/123 |
| 2002/0117283 A1* | 8/2002 | Soderholm | D21F 9/003 162/358.1 |
| 2003/0106662 A1* | 6/2003 | Haase | D21F 9/003 162/308 |
| 2005/0167066 A1* | 8/2005 | Herman | D21F 11/006 162/308 |
| 2007/0084573 A1* | 4/2007 | Bunker | B65D 81/3874 162/123 |
| 2007/0131368 A1* | 6/2007 | Xia | B31C 3/00 162/123 |
| 2007/0240842 A1* | 10/2007 | Scherb | D21F 11/145 162/358.3 |
| 2009/0288311 A1* | 11/2009 | Da Silva | D21F 5/182 34/477 |
| 2011/0303382 A1* | 12/2011 | Haussler | D21F 1/028 162/343 |
| 2013/0160321 A1* | 6/2013 | Da Silva | D21F 11/145 34/444 |
| 2014/0096927 A1* | 4/2014 | Dionne | D21F 3/04 162/348 |
| 2015/0114581 A1* | 4/2015 | Kinnunen | B32B 29/005 162/158 |
| 2015/0315747 A1* | 11/2015 | Heiskanen | D21F 11/00 162/158 |
| 2017/0335522 A1* | 11/2017 | Heiskanen | D21H 21/16 |
| 2021/0221114 A1* | 7/2021 | Lampainen | D21H 17/44 |
| 2021/0277607 A1* | 9/2021 | Svending | D21H 17/675 |

FOREIGN PATENT DOCUMENTS

| | | | |
|---|---|---|---|
| CN | 102197177 A | 9/2011 | |
| CN | 104995353 A | 10/2015 | |
| CN | 106460328 A | 2/2017 | |
| DE | 3014321 A1 | 9/1981 | |
| DE | 4212609 A1 * | 10/1993 | D21F 1/48 |
| DE | 4402273 A1 * | 6/1994 | D21F 11/04 |
| DE | 4031038 C2 * | 1/1997 | D21F 11/04 |
| DE | 102018121032 A1 | 6/2019 | |
| EP | 0304098 A1 | 2/1989 | |
| EP | 0627306 A1 | 6/1994 | |
| EP | 0627306 A1 | 12/1994 | |
| EP | 627306 A1 * | 12/1994 | B31C 3/00 |
| GB | 2073798 A | 10/1981 | |
| JP | 2002309495 A | 10/2002 | |
| JP | 2007519835 A | 7/2007 | |
| RU | 2202021 C2 | 4/2003 | |
| RU | 2020112320 A * | 10/2021 | D21F 1/16 |
| WO | WO-9312291 A1 * | 6/1993 | D21F 1/48 |
| WO | 9409207 | 4/1994 | |
| WO | 9519930 | 7/1995 | |
| WO | 2008076056 A1 | 6/2008 | |
| WO | 2010046527 A1 | 4/2010 | |

OTHER PUBLICATIONS

John Sjoeberg, International Search Report for Application No. PCT/IB2018/056616, dated Oct. 26, 2018.

Pappersteknik, 2nd ed., Institutionen för Pappersteknik, Tekniska högsk., 1992, p. 247.

* cited by examiner

METHOD TO PRODUCE A PAPERBOARD, A PAPERBOARD AND A CORRUGATED BOARD

This application is a U.S. National Stage under 35 U.S.C. § 371 of International Application No. PCT/IB2018/056616, which claims priority to Swedish Patent Application No. 1751057-9, filed Sep. 1, 2017.

TECHNICAL FIELD

The present invention relates to a method for producing a paperboard wherein the paperboard is produced by dewatering a furnish on a wire by subjecting it to high pressure. The invention also relates to a paperboard and a corrugated board comprising said paperboard.

BACKGROUND

Paperboard is a very commonly used material for packages. Important properties for a paperboard are strength, flexibility and ability to resist moisture. One way to increase the strength of a paperboard is to increase the density. However, increased density gives a much heavier paperboard which both will increase the weight of the package and also increase the production cost. There is thus an incentive to increase the strength of a paperboard, such as the bending resistance without increasing the density too much.

Paperboard can be both a single- and multiply product. When multiply paperboard is produced it is important that the bond between the plies of the paperboard is good to prevent delamination problems. Example of multiply paperboard products is liquid packaging board, food service board, cup stock and corrugated board.

Corrugated board is a fiber based material comprising a corrugated medium (fluting) and at least one flat liner or linerboard attached onto a surface of the fluted medium, thus forming a sandwich structure. The corrugated medium, is formed by using heat, moisture and pressure, into a corrugated shape using a corrugator. The sandwich can be formed in different ways such as in single, double, and triple walls as described in Kirwan M., J., Paper and Paperboard. Packaging Technology, Blackwell Publishing 2005.

There are different kinds of corrugated board qualities, and these might comprise different types of liners and corrugated media. Examples of different types of liners are kraftliner, white top kraftliner and testliner. Kraftliner is typically produced from kraft pulp that can be bleached or unbleached and comprises one or more layers wherein top layer is often optimized to provide good printing surface and good moisture resistance. Testliner is mainly produced from recycled old corrugated board and is mostly done in two layers. Whereas the first layer usually always comprises recycled fibers, the top layer might contain e.g. virgin fibers in order to provide a better quality. For corrugated media recycled or semichemical fibers are typically used. Common for all corrugated board qualities is that they are made of a high portion renewable materials which makes it a sustainable packaging material compared to many other packaging materials.

One important feature for corrugated boards are the strength, especially compression strength. It is important that the corrugated board is strong and able to withstand outer influences. It is also important that a corrugated board can keep its strength even at fluctuating humidity.

A corrugated board is produced by joining a corrugated medium to a flat liner by the use of an adhesive. A second glue application step can be used to treat the corrugated medium on the backside prior to attaching a second liner to produce a double face corrugated board. One problem when producing a corrugated board is the adhesion of the liner to the fluting. Too little adhesion causes delamination and addition of too much glue to ensure that the adhesion is sufficient causes washboarding and curl of the corrugated board. It is very important that the adsorption of the added glue into the liner and/or corrugated medium is optimal. If it is not adsorbed by the fluting/liner delamination will occur and the same happens if it is adsorbed too much into the fluting/liner.

There is thus a need to solve the problem mentioned above for a paperboard.

SUMMARY

It is an object of the present invention to produce a paperboard, which eliminates or alleviates at least some of the disadvantages of the prior art paperboards, especially to produce a paperboard with high strength and less delamination problems. Another object of the present invention is to produce a corrugated board comprising a corrugated medium and at least one liner having reduced delamination tendencies and improved strength.

The invention is defined by the appended independent claims. Embodiments are set forth in the appended dependent claims and in the following description.

The present invention relates to a method for producing a paperboard comprising the steps of; providing a furnish comprising cellulosic fibers, applying the furnish on at least one wire to form a web, dewatering the web on said at least one wire by subjecting the web to a pressure above 150 kPa without the use of a press roll nip and thereafter pressing the dewatered web to form a paperboard. By subjecting the web to a pressure above 150 kPa, preferably above 200 kPa, on the wire it was found that a density difference within the web is formed during dewatering, where the middle part of the web is denser than the top and bottom parts. It has surprisingly been found that by creating such density difference the compression strength of the web and produced paperboard is improved. Also, the paperboard according to the invention has more porous surfaces which surprisingly has been shown to improve the adhesion between the plies of a multiply paperboard product.

The web comprises a first and second side and the dewatering is preferably done from both sides of the web. It is preferred that the dewatering is done from both sides of the web at the same time.

The amount of water removed from the first side of the web is preferably between 35-65 wt-% of the total amount of water removed during the dewatering on the wire. The amount of water removed from the second side of the web is preferably between 35-65 wt-% of the total amount of water removed during the dewatering on the wire. It is preferred that the same amount of water is removed from each side of the web, i.e. the most preferred is that 50% by weight of the total amount of water removed from the first side and 50% by weight of the total amount of water removed from the second side. In this way the part of the web with increased density will be located in the middle part of the web making it possible to produce a more symmetrical web.

The dry content of the web after pressing is preferably above 45% by weight. It has surprisingly been found that it is possible to increase the dry content of the web after pressing. Since a web with a more porous top and bottom part is produced with the method according to this invention it is possible to remove more water from the web during pressing. Thus, a product with higher dry content can easily be produced after the press section.

The density of the paperboard is preferably above 680 kg/m$^3$. The density of a corrugated medium is preferably above 750 kg/m$^3$. The density for of a liner is preferably above 800 kg/m$^3$.

The difference in density between the top and bottom parts of the paperboard and the middle part of the paperboard is preferably at least 10%. It is preferred that the difference in density is at least 15%.

The geometrical SCT index of the paperboard is preferably above 32 Nm/g, more preferably above 35 Nm/g and even more preferably above 37 Nm/g.

The furnish preferably comprises more than 50% by weight of NSSC pulp based on the total fiber amount. It is even more preferred that the furnish comprises more than 65% by weight or even more preferably above 80% by weight of NSSC pulp. NSSC pulp has been found to comprise a suitable amount of bonding fines that helps to create the density difference during dewatering according to the invention which makes it very suitable to use high amounts of NSSC pulp for the production of the paperboard according to the invention. NSSC pulp are especially useful when making corrugated board.

The furnish may further comprise 0.1-10% by weight of microfibrillated cellulose (MFC) based on the total fiber amount. It is preferred that the furnish comprises 2-5% by weight of MFC based on the total fiber amount. The addition of MFC has shown to both increase the strength of the paperboard but also to contribute to the density difference that occurs.

The increased pressure is preferably achieved by changing the wrap angle of the wire over a roll in the dewatering section and/or by the use of vacuum.

The paperboard is preferably a corrugated medium wherein the method further comprises the step of corrugating the paperboard to produce a corrugated medium.

The paperboard is preferably a liner.

The present invention further relates to a paperboard comprising a top, bottom and middle part wherein the top and bottom parts of the paperboard have a first density and the middle part of the paperboard has a second density wherein the second density is higher than the first density. It is preferred that the second density is at least 10% higher than the first density. It is preferred that the first density is above 600 kg/m$^3$, preferably between 600-800 kg/m$^3$ and it is preferred that the second density above 700 kg/m$^3$, preferably between 700-900 kg/m$^3$.

The paperboard preferably has a density above 680 kg/m$^3$, preferably above 700, even more preferred above 750 kg/m$^3$ or even more preferred above 800 kg/m$^3$. The paperboard preferably has a geometrical SCT value above 32 Nm/g, preferably above 35 Nm/g or even more preferred above 37 Nm/g.

It is preferred that the paperboard comprises more than 50% by weight of NSSC pulp based on the total fiber amount, even more preferred more than 65% by weight or even more preferred more than 80% by weight.

The paperboard preferably comprises between 0.1-10% by weight of microfibrillated cellulose based on the total fiber amount.

The paperboard may be a liner.

The paperboard may also be a corrugated medium. It is preferred that the corrugated medium has a grammage between 80-220 g/m$^2$, preferably between 100-150 g/m$^2$. By the present invention it has been found possible to reduce the gram mage of the produced corrugated medium since the strength of the corrugated medium is increased.

The present invention also relates to a paperboard produced according to the method as described above.

The present invention further relates to a corrugated board comprising a corrugated medium and at least one liner wherein the corrugated medium and/or liner comprises a top, bottom and middle part wherein the top and bottom parts have a first density and the bottom part has a second density wherein the second density is higher than the first density.

DETAILED DESCRIPTION

The present invention relates to a method to produce a paperboard, a paperboard and a corrugated board comprising said paperboard. It may be preferred that the paperboard is a containerboard, i.e. a corrugated medium and/or a liner, used to produce a corrugated board.

The method to produce a paperboard according to the present invention comprises the steps of; providing a furnish comprising cellulosic fibers, applying the furnish on at least one wire to form a web, dewatering the web on said at least one wire by subjecting the web to a pressure above 150 kPa, preferably above 200 kPa without the use of a press roll nip and thereafter pressing the dewatered web to form a paperboard. The increased pressure is preferably applied in the forming section of a paper on paperboard machine. The forming section is also referred to as the dewatering section. By subjecting the web to a dewatering pressure above 150 kPa on the wire and without the use of a press roll nip it has been shown that a paperboard or a web having a density difference in the z-direction of the paperboard or web can be produced in a very easy and efficient way. The density difference in the z-direction is formed due to that the dewatering is done at a high pressure and in a way that allows the water to be removed by flowing freely through and from the web. It was surprising that a paperboard with a density difference in the z-direction has good strength properties, especially good compression strength. It was also found that the paperboard according to the invention had reduced delamination problems when used in a corrugated board.

The increased dewatering pressure is preferably achieved by changing the wrap angle of the wire over a roll in the dewatering section and/or by the use of vacuum. The rolls used in the dewatering section (or forming section) are not placed on opposite sides of the wire and not pressed against each other, consequently no roll nip is formed. The increased dewatering pressure can also be achieved by the use of vacuum applied below and/or above the at least one wire on which the web to be dewatered is located. The vacuum may be created by any suitable equipment, e.g. a suction box. It is important that the increased pressure is achieved without the use of a press roll nip. With "press roll nip" is meant a nip formed between two rolls that are pressed against each other. The use of press roll nips will not be able to form the mentioned density difference since the water removed is not allowed to flow freely through the web.

The dewatering of the web is preferably done from both sides of the web, i.e. from the first and second side of the web. It is preferred that the dewatering from both sides of the web is done at the same time. It may be preferred that the dewatering is done by using a twin wire. By dewatering the web from the first and second side of the web, the fines of the web is concentrated to the middle part of the web leading to increased density. It is also preferred that approximately the same amount of water is removed from both sides of the web to ensure that the fines are concentrated to the middle part of the web.

The density difference is preferably at least 10%, preferably at least 15% and preferably between 15-30%. It has been found that by having a more dense middle part of the web or paperboard, the problems with delamination when using the paperboard in a corrugated board is reduced. The difference in density between the top and bottom part and the middle part of the web or paperboard should be at least 10%. It has been shown that a density difference of at least 10% is sufficient to improve the delamination problems. It is however preferred that the density difference is at least 15%. For most applications the density difference to both achieve a good strength product and be able to reduce delamination is between 15-30%. By having lower density in the top and bottom part of the web, a paperboard or web with more porous surfaces is produced. This has been found to be a big advantage when producing a corrugated board since the adsorption of adhesive added to the surface is improved in such way that the delamination is reduced.

Pressing of the web after dewatering is preferably done in a press section of a paper or paperboard machine in any conventional way. An additional advantage with the present invention is that a web with more porous surfaces is produced which makes it easier to remove an increased amount of water in the press section. The dry content of the web after pressing is preferably above 45% by weight, preferably above 50% by weight. By the present invention it is thus also possible to produce a web with higher dry content after the press section thus reducing the subsequent drying demands of the web which will reduce the production cost of the paperboard.

Any additional process steps to produce said paperboard, such as drying or calendering may also be used. Any conventional drying equipment or calenders can be used.

Neutral Sulfite Semi-Chemical (NSSC) pulp is a high yield process for pulp production. It is a semi-chemical process including both chemical and mechanical treatment. The cooking liquor used during NSSC pulping comprises sulfite, e.g. $Na_2SO_3$ and/or $Na_2CO_3$ and a base, e.g. NaOH. The pH during cooking is preferably between 5-8 and the temperature is preferably between 160-190° C. The mechanical treatment can be done in any known way, e.g. by refining or grinding. It was found advantageous to use high amounts of NSSC pulp in the present invention. It is believed that NSSC pulp comprises a suitable amount of bonding fines that makes it possible to create the density difference during dewatering according to the invention.

The paperboard according to the invention comprises a top, a bottom and a middle part. The top part preferably constitutes between 20-25% of the total thickness of the paperboard, the bottom part preferably constitutes between 20-25% of the total thickness of the paperboard and the middle part preferably constitutes between 50-60% of the total thickness of the paperboard.

The density of the paperboard was measured according to ISO 534:2011. The first density of the bottom part of the paperboard was measured by grinding off the top and middle part of the paperboard and then measure the density on the remaining bottom part according to the standard. The same procedure applies when measuring the first density of the top part and the second density of the middle part of the paperboard.

The Short-spa Compressive Test (SCT) value was measured according to ISO 9895. The geometrical SCT value is calculated based on the measured SCT value in the cross machine direction (CD) and the SCT value measured in the machine direction (MD). The geometrical SCT value was calculated from the value in cross-machine direction and machine direction according to $(MD \times CD)^{1/2}$. The SCT index was then calculated by dividing the SCT value with the grammage. The unit for the SCT index is thus Nm/g.

The present invention also relates to a corrugated board comprising a corrugated medium (fluting) and at least one liner wherein the corrugated medium and/or liner comprises a top, bottom and middle part wherein the top and bottom parts have a first density and the bottom part has a second density wherein the second density is higher than the first density. The corrugated board thus comprises at least one paperboard as described above. The corrugated medium is produced by providing a paperboard and corrugating said paperboard to produce a corrugated medium. The corrugating process can be done in any known way.

The corrugated medium and at least one liner are attached to each other forming said corrugated board by arranging an adhesive between the corrugated medium and liner/s. The corrugated board preferably comprises at least two liners and at least one corrugated medium. The corrugated board may also comprise more than one corrugated mediums and more than two liners. The liner is attached to at least one surface of the corrugated medium by the adhesive. The adhesive is preferably applied on a least one surface of the fluted corrugated medium and the liner is thereafter attached to said surface. The adhesive may for example be a glue that is based on starch that can be extracted from a wide variety of plants. Some of the most common plants are maize, wheat, rice, potato, tapioca and peas. The starch is preferably native, i.e. no modification of the starch has been done. The adhesive may also comprise water, sodium hydroxide and boric acid. Other additives, such as additives to improve the wet strength or adhesive bond strength could also be added. Also, other functional chemicals in order to improve e.g. moisture resistance or gelling behavior can be added, e.g. borax, glyoxal or mixtures thereof. Any conventional adhesives in the area may be used.

The cellulosic fibers of the furnish can be any kind of fibers, such as hardwood and/or softwood fibers. The corrugated board, liner/s and/or corrugated medium may be produced by any kind of pulp, e.g. chemical pulp, mechanical pulp, thermomechanical pulp and chemi-thermomechanical pulp (CTMP), and neutral sulfite semi-chemical (NSSC) pulp. The furnish may comprise any one of a virgin and/or a re-cycled pulp.

The furnish preferably comprises microfibrillated cellulose (MFC). By adding MFC to the furnish the strength of the produced paperboard is increased. Also, it has been found that it is easier to achieve the desired density difference if the amount of fine material in the furnish is increased. The MFC tends to concentrate to the middle of the web when subjected to dewatering at high dewatering pressures. The amount of MFC added to the furnish is preferably 0.1-10% by weight of microfibrillated cellulose based on the total fiber amount, preferably between 2-5% by weight.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 10 to about 300 m²/g, or more preferably 30-200 m²/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated. MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CNF) defining a cellulose nanofiber material containing multiple elementary fibrils with both crystalline and amorphous regions, having a high aspect ratio with width of 5-30 nm and aspect ratio usually greater than 50.

In view of the above detailed description of the present invention, other modifications and variations will become apparent to those skilled in the art. However, it should be apparent that such other modifications and variations may be effected without departing from the spirit and scope of the invention.

The invention claimed is:

1. A method for producing a paperboard comprising the steps of;
    a) providing a furnish comprising cellulosic fibers,
    b) applying the furnish on at least one wire to form a web,
    c) dewatering the web on said at least one wire by subjecting the web to a pressure above 150 kPa without the use of a press roll nip and thereafter,
    d) pressing the dewatered web to form a paperboard, wherein the web comprises a first and second side and the dewatering is done from both sides of the web.

2. The method according to claim 1 wherein the pressure is above 200 kPa.

3. The method according to claim 1 wherein the amount of water removed from the first side of the web is between 35-65% by weight of the total amount of water removed and the water removed from the second side of the web is between 35-65% by weight of the total amount of water removed.

4. The method according to claim 1 wherein the dry content of the web after pressing in step d) is above 45% by weight.

5. The method according to claim 1 wherein the density of the paperboard is above 680 kg/m³.

6. The method according to claim 1 wherein the paperboard comprises a thickness having a top, bottom and middle parts, and wherein a difference in density between the top and bottom parts of the thickness of the paperboard and the middle part of the thickness of the paperboard is at least 10%.

7. The method according to claim 1 wherein a geometrical Short-span Compressive Test (SCT) index of the paperboard is above 32 Nm/g.

8. The method according to claim 1 wherein the furnish comprises more than 50% by weight of NSSC pulp based on the total fiber amount.

9. The method according to claim 1 wherein the furnish comprises 0.1-10% by weight of microfibrillated cellulose based on the total fiber amount.

10. The method according to claim 1 wherein the increased pressure is achieved by changing the wrap angle of the wire over a roll in a dewatering section and/or by the use of vacuum.

11. The method according claim 1 wherein the method further comprises the step of corrugating the paperboard to form a corrugated medium.

12. The method according to claim 1 wherein the method further comprises the step of forming the paperboard into a liner.

\* \* \* \* \*